W. H. NELSON.
INCLINATION INDICATOR.
APPLICATION FILED JUNE 27, 1918.
1,302,580.
Patented May 6, 1919.
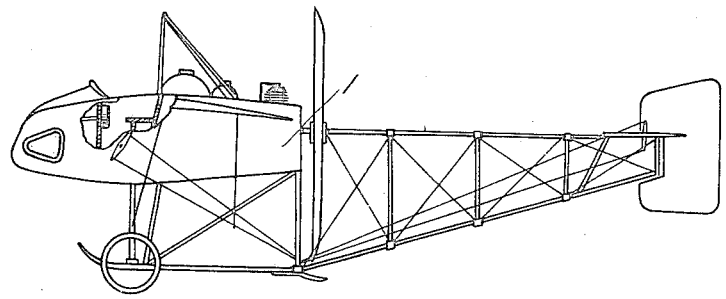
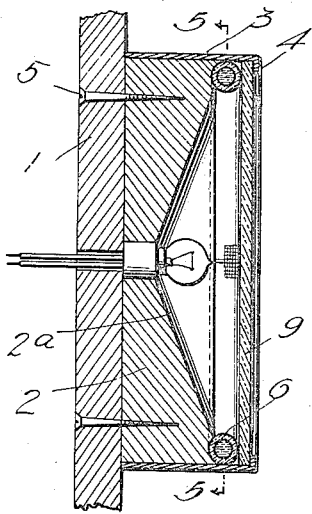
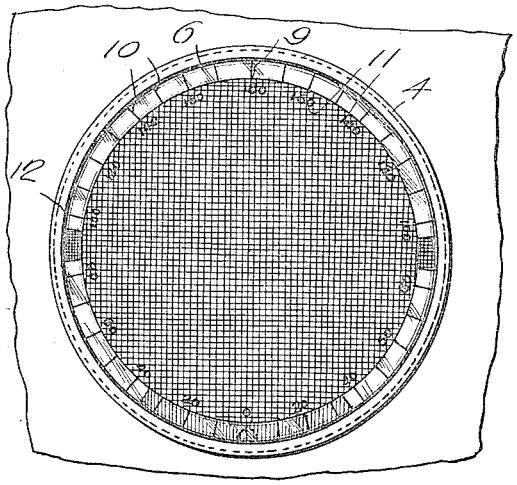
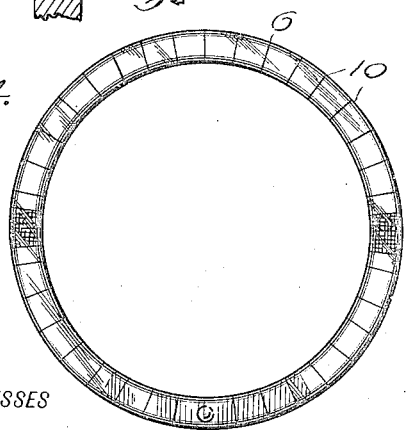
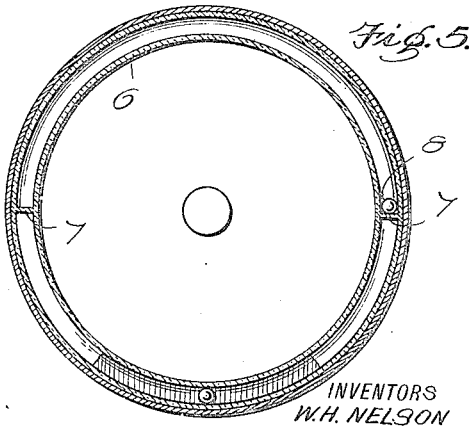
WITNESSES
H. Woodard
INVENTORS
W.H. NELSON
BY
ATTORNEYS

UNITED STATES PATENT OFFICE.

WESLEY HARMON NELSON, OF LOS ANGELES, CALIFORNIA, ASSIGNOR OF FORTY-NINE ONE-HUNDREDTHS TO BERTIE MAY PRIEST, OF LOS ANGELES, CALIFORNIA.

INCLINATION-INDICATOR.

1,302,580. Specification of Letters Patent. Patented May 6, 1919.

Application filed June 27, 1918. Serial No. 242,315.

*To all whom it may concern:*

Be it known that I, WESLEY HARMON NELSON, a citizen of the United States, and a resident of Los Angeles, in the county of Los Angeles and State of California, have invented certain new and useful Improvements in Inclination-Indicators, of which the following is a specification.

My invention is an improvement in inclination indicators, and has for its object to provide a device of the character specified designed for use with flying machines, to indicate the inclination of the machine both in axial and transverse directions in regard to the line of flight.

In the drawings:

Figure 1 is a side view of an aeroplane having the improved indicator;

Fig. 2 is a vertical section through the indicator;

Fig. 3 is a front view;

Fig. 4 is a front view of the indicator ring;

Fig. 5 is a sectional view of the same.

The present embodiment of the invention is shown in connection with an aeroplane 1, being arranged within the nacelle, the position depending upon whether transverse or axial inclination is to be indicated. In the former case, the instrument is arranged as shown in Fig. 1, that is, with its plane transverse to the direction of flight. In the second case, the device is arranged with its plane parallel with the line of flight.

The improved indicator comprises a block 2 of suitable material, as, for instance, wood, having a tapering recess 2ª on one face. A ring 3 of metal encircles the block and is secured thereto in any usual manner, and this ring, which is of greater depth than the block, has an inwardly extending marginal flange 4. The block 2 is secured to the framework of the aeroplane by means of screws 5 or the like, the position, as before stated, depending upon the inclination to be indicated.

A ring 6 of glass or like transparent material is arranged within the ring 3, resting on the block at the edge of the recess 2ª and engaging the ring 3 at its periphery. This ring is tubular or hollow, as shown more particularly in Fig. 5, and there are transverse partitions 7 arranged at points diametrically opposite, the said partitions being in the same plane and dividing the interior or bore of the ring into two chambers. Within each chamber is arranged a liquid and a ball 8, the said ball 8 being adapted to move through the liquid as the ring changes its position with the change of inclination of the aeroplane. The purpose of the liquid is to slow and steady the action of the bulb.

A disk 9 of transparent material, as, for instance, glass, is arranged outside of the ring 6, and this disk has its edge received between the flange 4 and the ring, and holds the ring in its seat on the block. As shown, the glass is painted to make it opaque inside the ring, and it will be evident that when the space behind the ring is lighted up by means to be presently described the ring throughout its entire extent will be visible at the outer edge of the painting on the glass.

The ring is provided on its outer face with graduations 10, and it will be obvious that these graduations may be arranged on the glass instead of on the ring, if desired. The graduations have indicating numerals 11 near them, the said numerals being on the glass disk 9, and these numerals run consecutively from 0 to 180. The 0 and 180 degree graduations are half way between the partitions 7 and of course are diametrically opposite each other.

It will be obvious that when the aeroplane is on a level keel the ball below the partition 7 will occupy a position at the graduation 0. The slightest inclination in either direction will cause the ball to roll, and the degree of inclination will be indicated by the position of the ball. Preferably, the portion of the ring or tube 6 on each side of each partition 7 is painted, as indicated at 12, the said painting extending from about graduation 85 to 95 at each side. The blackening at 12 is for the purpose of hiding the ball not at the moment in use. It will be obvious that when the device is in the position of Fig. 3 that ball above the partition 7 will be at one side, resting on one partition, and will be movable in only one direction, thus indicating tilting in but one direction. The ball below the partition, however, will indicate tilting in both directions.

It will be understood that the ring might be made opaque or in any other suitable manner at the partitions. The painted portion is at the front of the ring.

I claim:

1. An indicator for indicating tilting, comprising an annular hollow transparent ring having partitions located at diametrically opposite points and dividing the interior of the ring into two compartments each containing a fluid, a ball mounted to roll in each compartment, and a scale in connection with the ring for indicating the position of each ball, said scale comprising graduations on the ring, a casing for the ring having a transparent front, and indicating numerals on the front.

2. An indicator for indicating tilting, comprising an annular hollow transparent ring having partitions located at diametrically opposite points and dividing the interior of the ring into two compartments each containing a fluid, a ball mounted to roll in each compartment, and a scale in connection with the ring for indicating the position of each ball, the ring having opaque portions at the partitions to hide the balls when resting on the partitions.

3. An indicator for indicating tilting, comprising an annular hollow transparent ring having partitions located at diametrically opposite points and dividing the interior of the ring into two compartments each containing a fluid, a ball mounted to roll in each compartment, a scale in connection with the ring for indicating the position of each ball, a casing in which the ring is mounted, said casing being transparent at its front at the ring, and a source of illumination within the casing.

4. An indicator for indicating tilting, comprising an annular hollow transparent ring having partitions located at diametrically opposite points and dividing the interior of the ring into two compartments each containing a fluid, a ball mounted to roll in each compartment, and a scale in connection with the ring for indicating the position of each ball.

5. An indicator for indicating tilting, comprising an annular hollow transparent ring having partitions located at diametrically opposite points and dividing the interior of the ring into two compartments and each compartment containing a fluid, and a ball mounted to roll in each compartment.

WESLEY HARMON NELSON.